United States Patent
Nai

(10) Patent No.: US 6,568,242 B2
(45) Date of Patent: May 27, 2003

(54) SYSTEM FOR REDUCING EFFECTS OF ACCELERATION INDUCED DEFLECTIONS ON MEASUREMENT MADE BY A MACHINE USING A PROBE

(75) Inventor: Kenneth C-H Nai, Edinburgh (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/092,520

(22) Filed: Mar. 8, 2002

(65) Prior Publication Data

US 2002/0095975 A1 Jul. 25, 2002

Related U.S. Application Data

(62) Division of application No. 09/352,947, filed on Jul. 14, 1999, now Pat. No. 6,412,329.

(30) Foreign Application Priority Data

Jul. 22, 1998 (GB) .............................. 9815830

(51) Int. Cl.⁷ .............................................. G01B 21/04
(52) U.S. Cl. ............................ 73/1.79; 33/502; 33/503
(58) Field of Search ................................. 73/1.38, 1.79, 73/1.37; 702/94, 95, 96; 33/502, 503, 504, 561; 700/188, 63, 304

(56) References Cited

U.S. PATENT DOCUMENTS

| | | | | |
|---|---|---|---|---|
| 2,914,763 A | * | 11/1959 | Greenwood, Jr. et al. | 33/321 X |
| 3,288,160 A | * | 11/1966 | Eggenburger et al. | 137/48 |
| 3,301,508 A | * | 1/1967 | Yamron | 33/323 X |
| 3,405,599 A | * | 10/1968 | Barlow et al. | 89/41.09 |
| 3,568,029 A | | 3/1971 | Bollinger | 318/578 |
| 3,836,835 A | * | 9/1974 | Sawyer | 318/685 |
| 4,143,311 A | | 3/1979 | Lee | 318/611 |
| 4,345,154 A | | 8/1982 | Bainbridge | 318/621 |
| 4,841,184 A | * | 6/1989 | Chen et al. | 310/90.5 |
| 4,904,152 A | | 2/1990 | Doi et al. | 414/730 |
| 4,925,312 A | | 5/1990 | Onaga et al. | 700/261 |
| 4,992,716 A | | 2/1991 | Ellis | 318/661 |
| 5,049,797 A | | 9/1991 | Phillips | 318/568.16 |
| 5,384,525 A | * | 1/1995 | Kato | 700/40 X |
| 5,589,748 A | * | 12/1996 | Kazama et al. | 700/188 X |
| 5,594,668 A | | 1/1997 | Bernhardt et al. | 702/95 |
| 5,681,981 A | | 10/1997 | McMurtry | 33/502 X |
| 5,714,831 A | * | 2/1998 | Walker et al. | 310/316.01 |
| 5,834,623 A | | 11/1998 | Ignagni | 33/502 X |
| 6,156,625 A | | 12/2000 | Balamurugan | 702/95 X |
| 6,174,788 B1 | | 1/2001 | Balamurugan | 702/95 X |
| 6,182,369 B1 | | 2/2001 | Hirano et al. | 702/94 X |

FOREIGN PATENT DOCUMENTS

| | | | | |
|---|---|---|---|---|
| GB | 2 045 437 B | | 2/1984 | G01B/21/02 |
| JP | 4-15715 | * | 1/1992 | 137/47 |

* cited by examiner

Primary Examiner—Thomas P. Noland
(74) Attorney, Agent, or Firm—Oliff & Berridge, PLC

(57) ABSTRACT

A coordinate measuring machine (CMM) carries a probe and is controlled by a controller to drive the probe to take measurements on a workpiece. In order to reduce the effects of acceleration-induced deflections of the probe on the measurements made by the machine, accelerometers are provided to measure the accelerations of the probe and to produce signals indicative thereof. The acceleration signals (45) are passed to the controller (FIG. 2) where they are integrated (46) and filtered (48) before being passed as velocity signals (49) to a summing junction (50) from which they are fed to a velocity feedback control loop[ (34, 35, 36, 37) which reduces any changes in the velocity (and hence deflection) of the probe due to the accelerations.

3 Claims, 2 Drawing Sheets

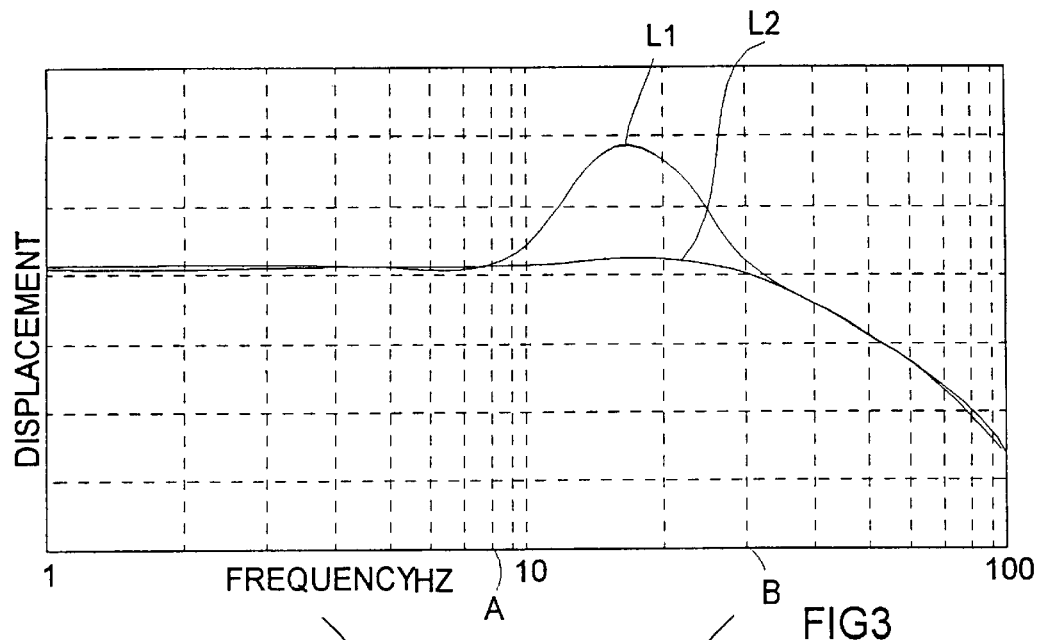
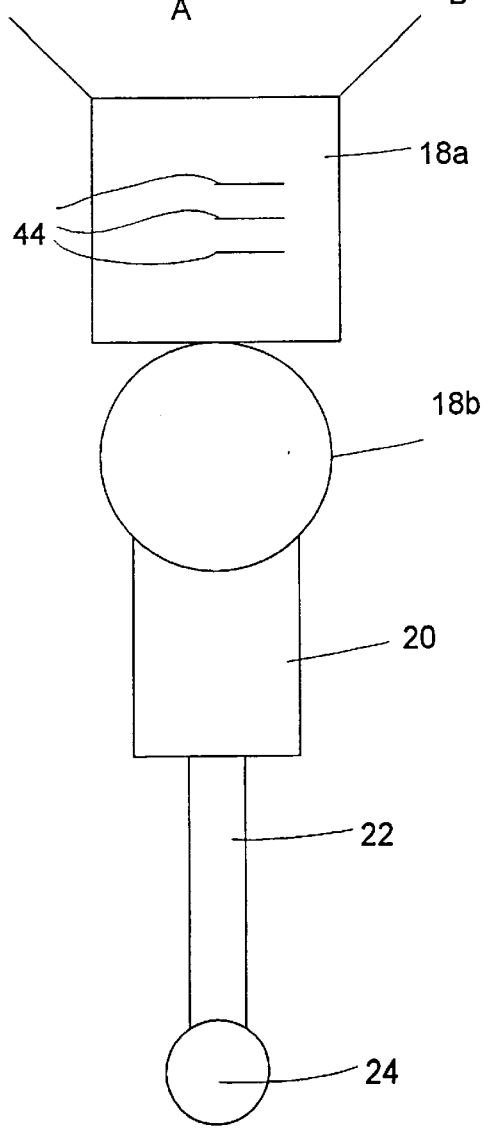
FIG3
FIG4

SYSTEM FOR REDUCING EFFECTS OF ACCELERATION INDUCED DEFLECTIONS ON MEASUREMENT MADE BY A MACHINE USING A PROBE

This is a Division of application Ser. No. 09/352,947 filed Jul. 14, 1999 and now U.S. Pat. No. 6,412,329. The entire disclosure of the prior application is hereby incorporated by reference herein in its entirety.

BACKGROUND OF THE INVENTION

The invention relates to reducing the effects of machine vibration on the accuracy of measurements made by a machine using a probe carried by the movable arm of a machine, for example a coordinate measuring machine (CMM), during a measurement process. The invention is applicable to a measurement process in which the measurements are made using a touch trigger method or a scanning method and may involve the use of analogue, digital probes or non-contact probes.

One method of 3D surface scanning involves moving a scanning probe attached to the quill of a CMM over the surface of an article to be measured, and noting the coordinates of the position of a workpiece-contacting stylus of the scanning probe at a number of points on the surface of the article. The motors of the machine are provided with speed demand signals from the controller, and it is usual to have servo-loops within the controller which obtain position and velocity feedback from each axis of the machine to control the motor speeds. Velocity feedback is derived by means of a tachogenerator on the motor, and positional feedback is obtained by means of a linear encoder system on each axis of the CMM.

The current method however does not take into account the dynamics of the CMM. It assumes that all the axes of the CMM are rigid, and therefore that the feedback from the tachogenerators and linear encoders are sufficient for accurate servo control of the position of the scanning probe.

However, CMMs are not infinitely rigid structures. Most have flexible structural members onto which the probe is mounted, and these are subject to vibration, produced by the drive motors and external disturbances such as air bearing instability and mechanical linkages. These vibrations, either by themselves or by exciting the resonant frequencies of the machine structures, can give rise to the scanning probe losing contact with the surface being scanned, or inaccuracies in the measurements being taken, resulting in reduced measuring accuracy and increased scanning time.

In the scanning process described above, scanning time can be reduced if the coordinate measuring machine can be run at higher speed, and if less time is spent on surface recoveries, i.e. repeating movements where the scanning probe left the surface.

In a touch trigger measurement process during which the machine is stopped each time the probe contacts a workpiece, measurement speed can be increased if the machine could be allowed to move around more quickly and to stop and start more quickly with less vibrations.

Various methods have been used in the past to try and eliminate or at least reduce the effects of such vibrations.

For example, vibrations can arise from the frequency response of the various structures of the machine to frequencies induced in the drive motors by the demand signal, particularly if the demand voltage is in the form of a step function.

One commonly practised method is to reduce the overall feedback gain of the position and velocity servo loops.

Reducing servo loop gain will reduce the frequency bandwidth of the control system i.e. the range of frequencies over which control can be maintained, and will result in the loss of servo performance, e.g. large position overshoot, poor position tolerance. Another commonly used method of combatting structural resonance induced by the drive motors is to introduce a notch filter as part of the velocity loop, or in the input to the velocity servo controller. This notch filter is tuned to the dominant resonant frequency of the machine. This method is limited however in that it removes movements only at one particular frequency and may also reduce the servo bandwidth for that axis. However, it is possible for a coordinate measuring machine axis to have more than one resonant frequency.

It is also known from U.S. Pat. No. 5,594,668, to establish parameters characterising elastic bending behaviour of the CMM for several probe positions within the measuring range. This is done by determining components of the parameters which are dependent upon the position of the probe on the machine slides and on acceleration forces acting on the slides, and storing details of these components as correction values for subsequent use in correcting measurements made on workpieces.

These stored values are obtained by measuring the acceleration of the machine's slides during a measuring process, or by determining the acceleration from the positional data generated by the measuring systems of the machine, and differentiating the positional data twice according to time. The disadvantage of this method however, is that it is not dynamic insofar as the correction values are generated during a calibration process and stored in a multi-dimensional correction table. In order to minimise the number of points required to be calibrated to construct this table, the ability to interpolate between points stored in the table is an essential requirement of the system.

It is also known from UK Patent No. 2,045,437, to provide accelerometers in a probe which is mounted on the quill of a CMM, to determine from the measured accelerations of the quill what the resultant deflection of the quill is, and to correct the probe reading from such deflections.

Once again however, this process is not dynamic insofar as it requires a calibration process to establish in a memory store, a table of deflections for different accelerations at different positions within the measuring volume of the machine, and the actual measurements taken during a measuring process are then corrected by reference to correction values taken from the memory store.

SUMMARY OF THE INVENTION

An object of the present invention is to provide a dynamic method of reducing acceleration-produced errors in machine measurements.

Another object of the present invention is to provide apparatus which performs the above method without reducing the range of frequencies over which good servo control over the machine movements can be maintained.

In accordance with the present invention, there is provided a method of reducing measurement errors made by a machine using a probe comprising the steps of:

deriving acceleration signals indicative of accelerations of moving parts of the machine, deriving from the acceleration signals, velocity signals indicative of the change in velocity of the moving part caused by the accelerations, and using the velocity signals in a velocity feedback control loop to provide correction signals to the machine to reduce the effects of acceleration-induced deflections of machine parts on the measurements made by the machine.

It may be possible on some axes of the machine to derive the acceleration signals by measuring the displacement of the respective moving part of the machine and differentiating the displacement twice with respect to time.

Preferably however, the accelerations of the moving parts are measured directly using accelerometers placed in association with the respective parts.

The accelerometers may be positioned on the readheads which measure the movements of the machine axes, but the best results are obtained when the accelerometers are positioned on or close to the probe, e.g. in the probe body, on the head on which the probe is mounted, on the machine quill to which the head is mounted, or even on the probe stylus.

BRIEF DESCRIPTION OF THE DRAWINGS

Examples of preferred embodiments of the invention will now be described with reference to the accompanying drawings in which:

FIG. 3 is a graphical representation of the frequency response of the probe head to the drive demand, and FIG. 4 is a diagrammatic representation of the probe and probe head including accelerometers of the present invention.

DETAILED DESCRIPTION OF THE INVENTION

Figure 1:
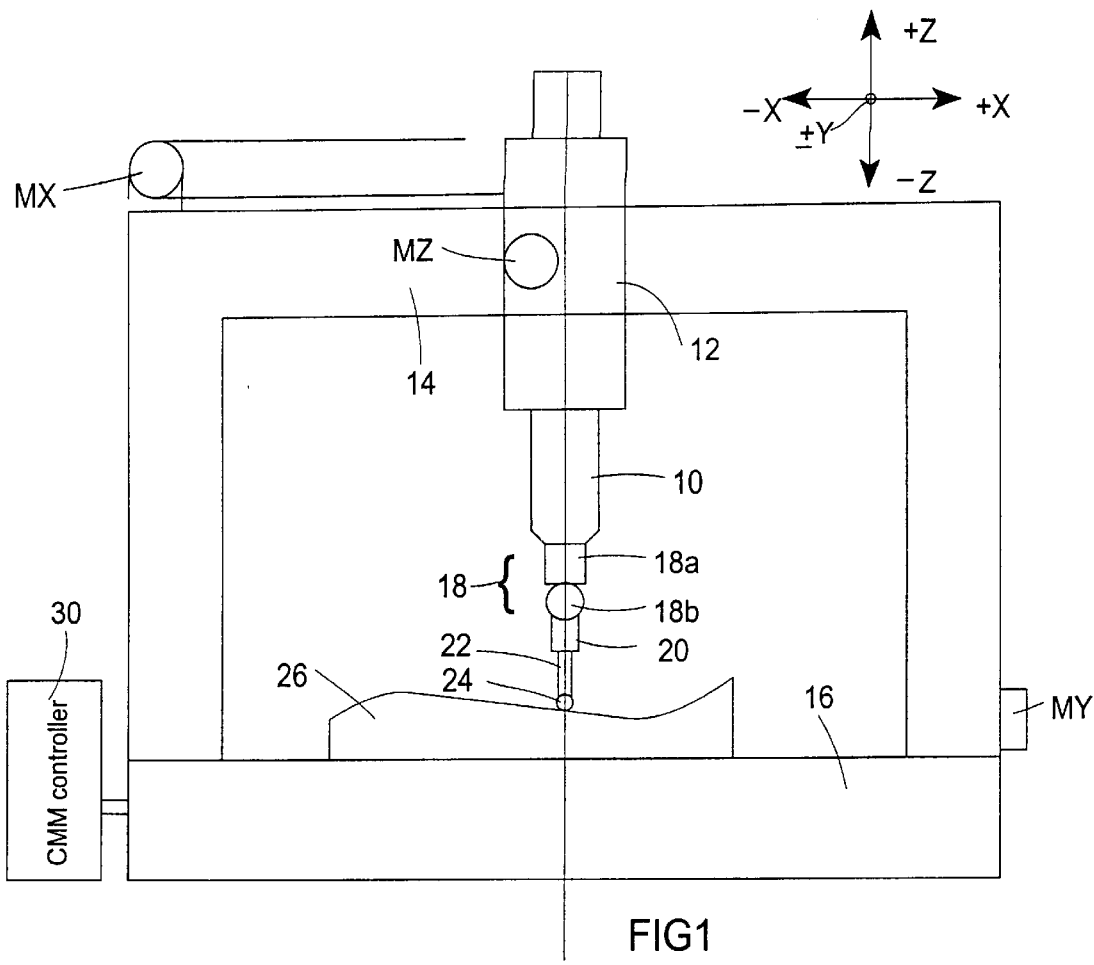
FIG. 1 is an illustration of a CMM including a measuring probe mounted on an articulating probe head.

Referring now to FIG. 1, there is shown a CMM having a quill 10 mounted on a crosshead 12 for linear displacement in the direction of an axis Z, the crosshead 12 being supported on a frame 14 for linear displacement in the direction of an axis X, and the frame 14 is supported on a base 16 for linear displacement in the direction of an axis Y. The axes X, Y and Z are mutually perpendicular.

In use, the quill 10 supports an articulating probe head 18, which in this embodiment, carries a scanning probe 20 having a stylus 22 with a spherical tip 24 for contacting a workpiece 26. It is to be understood that the invention is applicable for the control of vibrations in many types of machines carrying various types of probes including analogue scanning probes, touch trigger probe or non-contact probes.

The members 10,12,14 are adapted to be driven in the directions of the X, Y and Z axes by motors MX, MY, and MZ respectively, and the instantaneous positions of the members 10, 12, 14 in the respective directions X, Y, Z are sensed in known manner by measuring devices (not shown) on the respective axes, for example scales and opto-electronic readheads.

Figure 2:
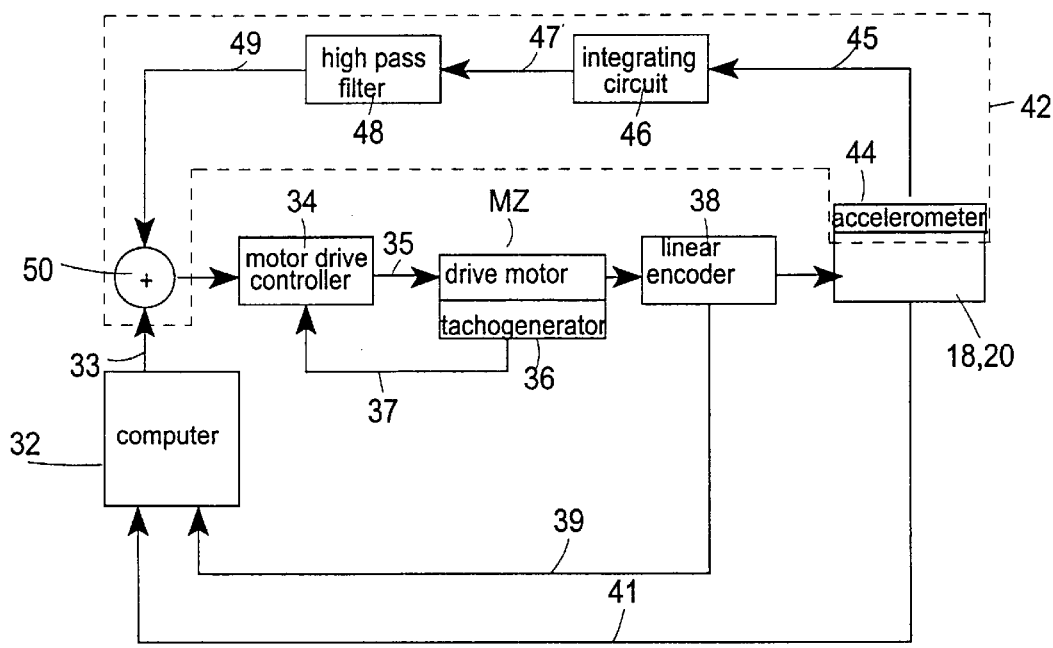
FIG. 2 is a block diagram of the control system for the CMM including the additional velocity feedback loop of the present invention.

A controller 30, further detail of which is shown in FIG. 2, is programmed to operate the motors MX, MY and MZ in order to move the probe stylus 22 over the surface of the workpiece 26 whereby the coordinate positions of points on the surface of the workpiece may be determined.

The articulating probe head 18 has two relatively rotatable parts 18A and 18B, part 18A being rotatable about the Z axis of the machine, and part 18B being rotatable about one of the X or Y axes of the machine in order to orientate the stylus within the working volume of the machine at any desired angle. It is to be understood however, that the articulating probe head is not an essential requirement of the machine system.

Referring now to FIG. 2, the CMM controller 30 includes a computer 32 which generates demand signals for the motors MX, MY and MZ. FIG. 2 illustrates a servo-control system for one of the motors MZ, the operation of which is described below, it being understood that similar control loops are provided for the motors MX and MY.

In a measuring operation the computer is programmed to move the machine to various positions relative to the workpiece. To initiate a move the computer 32 sends a speed demand signal 33 to the motor drive controller 34. The motor drive controller generates a signal 35 which is passed to the drive motor MZ, which in turn drives the member 10 along the Z axis to the required position.

The velocity of the machine movement is controlled by a servo-loop which includes a tachogenerator 36, which monitors the motor speed and sends a motor speed signal 37 back to the drive controller 34 which ensures that the motor is driven in accordance with the speed demand signal from the computer 32.

In addition, a position servo loop is provided which comprises a linear encoder 38 on the Z axis of the machine which monitors the position of the member 10 along the Z axis. Encoder 38 sends back a position signal 39 to the computer 32 which maintains the speed demand signal until the member 12 has arrived at the desired point on the Z axis.

Such servo loops are conventional in current CMM controllers. To complete the information required for the measurement process, signals 41 are provided from measuring devices in the articulating probe head and the probe to provide the computer 32 with information as to the orientation of the probe relative to the probe head, and the deflection of the probe stylus relative to the probe body due to contact of the stylus with the workpiece. This information along with the information from the linear encoders 38 in each axis enables the computer to calculate the co-ordinates of points on the surface of the workpiece which are contacted by the stylus ball.

Referring now to FIG. 3, line L1 shows a typical frequency response of the probe head in the Z axis to the motor drive demand. In the figure, the vertical axis shows the magnitude of the displacement of the machine quill 10 relative to the readheads due to vibration, against the frequency which is plotted on the horizontal axis. It can be seen that at low frequencies up to point A the system acts as if the machine structure was rigid and there is virtually no deflection of the machine quill 10, and thus the probe, relative to the readhead due to vibration. However, beyond point A as the frequency increases and the displacements of the probe and readheads become uncoupled, the magnitude of the relative deflection produced by the vibration increases and reaches a peak as the frequency passes through the resonant frequency of the machine structure. Beyond the resonant frequency the displacements of the probe and readheads fall away rapidly.

The present invention provides a method of minimising the effect of these deflections caused by machine vibration on the measurements made by the probe during a measuring process. This is achieved by the inclusion of a further feedback loop in the controller which operates as described below. Once again the additional feedback loop is described with reference to the Z axis only, it being understood that similar feedback loops will be added to the control of the X and Y axis movements.

Referring once again to FIG. 2 the novel additional features of the further feedback loop are enclosed inside the dotted line referenced 42.

An accelerometer 44 positioned in the probe or probe head, measures the accelerations of the probe head or probe as the machine moves in response to the motor speed demand signals and produces an acceleration signal 45.

The signal 45 is integrated and multiplied by a scaling factor in an integrating and scaling circuit 46 to obtain the velocity of the probe in the respective axis direction which is due to the acceleration.

The integration and scaling process 46 can be implemented either by an analogue electronic circuit or in digital software. Signals produced from accelerometers are normally prone to offset drift caused by changes in temperature and accelerometer mounting orientation. The integrator is frequency bandwidth limited to remove low frequencies and offset signals, so that the integrator will only operate above the integrator frequency (wi). The integrator frequency (wi) is fairly low, generally about one order to magnitude below the resonant frequency of that axis. The derived bandwidth limited quill velocity signal 47 is passed to a second order high pass filter 48 which eliminates frequencies below the lowest resonant frequency of the machine to produce the required velocity signal 49. Again this filter 48 can either be implemented by an analogue electronic circuit or in digital software.

The velocity signal 49 is fed to the a junction 50 where it is added to the speed demand signal from computer 32 to close the servo loop with the motor drive controller 34. Once again this further servo loop can be implemented either in software or hardware, and can form part of the CMM controller or may be an external addition to the CMM controller.

The additional servo loop increases the bandwidth of frequencies over which velocity control is possible. Low frequency velocity components from the probe head are not fed back by this servo loop due to the operation of the high pass filter. At these lower frequencies, i.e. below the resonant frequency of the machine structure on which the probe head is mounted, the probe head is rigidly coupled to the drive motor through the CMM structure, and any low frequency velocity changes can be handled by the conventional velocity control servo loop. However, at or above the resonant frequency of the machine structure, the probe head starts to become uncoupled from the motor. Since the high pass filter cuts in at frequencies when the probe head is not rigidly coupled to the motor, this added servo loop allows direct velocity control of the probe head and thus electronically increases the stiffness between the probe head and the drive motor at these higher frequencies.

In FIG. 3 line L2 shows that the magnitude of the quill deflections in the Z axis have been reduced using the additional control loop without reducing the range of frequencies over which the control system can operate.

FIG. 4 shows diagrammatically the probe head of the invention with accelerometers 44 for providing measurements of accelerations in the three orthogonal axes. The invention may be implemented by providing three accelerometers aligned for maximum response in each of the three orthogonal axes, or by providing a surface mounted integrated circuit for measuring accelerations in the three directions.

Refinements may be included in the basic circuit shown in FIG. 2 to improve the frequency bandwidth of the servo loop.

For example a pre-filter may be added between the speed demand signal 33 and the summing junction 50 to introduce frequency shaping to maintain as flat a closed loop frequency response as possible. In addition a compensator may be added after the summing junction to introduce further frequency shaping to improve servo loop stability and increase the bandwidth of the servo system.

Although the preferred embodiment has been described as using accelerometers mounted on the probe head this is not essential for operation of all embodiments of the invention. In certain types of CMMs the opto-electronic readheads, which take position readings from the machine scales may on some axes (particularly the Z axis), may be rigidly coupled to the probe. In such cases, for those axes, the velocity of the probe may be derived from either an accelerometer on the readhead, or by differentiating the readhead position signal over time.

What is claimed is:

1. A system for reducing effects of acceleration-induced deflections on measurements made by a coordinate measuring machine using a probe, comprising:

relatively movable parts of the coordinate measuring machine assembled to carry the probe;

a controller controlling movements of the relatively movable parts for measurements using the probe;

at least one accelerometer attached to at least one of the relatively movable parts and which produces an acceleration signal directly indicative of an acceleration of a relatively movable part;

an integrating means to generate a velocity signal indicative of a change in the velocity based on the acceleration signal; and a velocity feedback loop to process the velocity signal in a control feedback loop to reduce the effects of acceleration-induced deflections on measurements made by the coordinate measuring machine.

2. The system according to claim 1 further comprising a movable spindle on which the probe and at least one said accelerometer is mounted so as to measure the acceleration of the probe in at least one movement axis.

3. The system according to claim 1 wherein three accelerometers are used to measure accelerations of the probe in three movement axes.

* * * * *